US008515373B2

(12) United States Patent
de Ruijter et al.

(10) Patent No.: US 8,515,373 B2
(45) Date of Patent: Aug. 20, 2013

(54) APPARATUS FOR PROVIDING REFERENCE SIGNALS AND ASSOCIATED METHODS

(75) Inventors: Hendricus de Ruijter, Sunnyvale, CA (US); Sharon Mutchnik, San Jose, CA (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 13/250,074

(22) Filed: Sep. 30, 2011

(65) Prior Publication Data

US 2013/0083829 A1   Apr. 4, 2013

(51) Int. Cl.
*H04B 1/06* (2006.01)
(52) U.S. Cl.
USPC .......................................... 455/230; 455/255
(58) Field of Classification Search
USPC ........... 455/552.1, 230, 255, 259, 265, 196.1, 455/208, 209, 141
See application file for complete search history.

(56) References Cited

U.S. PATENT DOCUMENTS

| | | | | |
|---|---|---|---|---|
| 5,852,784 | A * | 12/1998 | Ito et al. | 455/552.1 |
| 6,006,080 | A * | 12/1999 | Kato et al. | 455/323 |
| 7,154,341 | B2 * | 12/2006 | Yamamoto et al. | 331/2 |
| 7,463,547 | B2 * | 12/2008 | Nakatsu et al. | 365/233.1 |
| 2009/0073899 | A1 * | 3/2009 | Forrester | 370/277 |
| 2009/0111398 | A1 * | 4/2009 | Leukkunen et al. | 455/114.2 |

* cited by examiner

*Primary Examiner* — Sonny Trinh

(74) *Attorney, Agent, or Firm* — Law Offices of Maximilian R. Peterson

(57) ABSTRACT

An apparatus includes a signal processing circuit and at least two oscillators that provide, respectively, at least first and second reference signals. The apparatus further comprise a selection circuit. The selection circuit provides to the signal processing circuit one of the first and second reference signals depending on a mode of operation of the signal processing circuit.

17 Claims, 6 Drawing Sheets

APPARATUS FOR PROVIDING REFERENCE SIGNALS AND ASSOCIATED METHODS

TECHNICAL FIELD

The disclosed concepts relate generally to electronic circuitry and, more particularly, to apparatus for providing reference signals (e.g., clock signals) to electronics circuitry, and associated methods.

BACKGROUND

Modern electronic circuits or systems often includes several blocks of circuitry. The blocks of circuitry provide some of the overall functionality of the circuit or system, such as data or signal processing, communication, computation, control functions, and the like. Each block may receive a number of inputs, such as data, general signals, and control signals. Further, each block may provide a number of outputs, such as data, general signals, and status signals.

Some of the blocks of circuitry perform functions that use one or more reference signals. The reference signals may provide timing (e.g., synchronization) for various functions. For example, reference signals may be used to time various events with respect to other events, e.g., synchronize two events. Examples of reference signals include clock signals, local oscillator signals, etc. Reference signals may be produced in a number of ways. Examples include resistive-capacitive (RC) oscillators, crystal oscillators, inductive-capacitive (LC) oscillators, and the like.

SUMMARY

Apparatus and methods for providing reference signals (e.g., clock signals) to electronics circuitry are disclosed. In one exemplary embodiment, an apparatus includes a signal processing circuit and two oscillators that provide, respectively, first and second reference signals. The apparatus further comprise a selection circuit. The selection circuit provides to the signal processing circuit one of the first and second reference signals depending on a mode of operation of the signal processing circuit.

In another exemplary embodiment, a communication apparatus includes a radio-frequency (RF) device, two oscillators, and a selection circuit. The RF device operates using a reference signal to process RF signals. The first of the two oscillators provides a first reference signal to be used as the reference signal during one mode of operation of the RF device. The second of the two oscillators provides a second reference signal to be used as the reference signal during another mode of operation of the RF device. The selection circuit selectively provides as the reference signal one of the first and second reference signals.

In yet another exemplary embodiment, a method of operating a signal processing circuit that uses a reference signal to process signals includes providing to the signal processing circuit as the reference signal a first reference signal from a first oscillator during a first mode of operation of the signal processing circuit. The method further includes providing to the signal processing circuit as the reference signal a second reference signal from a second oscillator during a second mode of operation of the signal processing circuit.

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts relate generally to apparatus and method for generating and providing references signals to one or more electronic circuits or blocks. The nature, type, and number of the reference signals depends on the application, implementation, or end use, as persons of ordinary skill in the art understand. Without limitation, examples of references signals in exemplary embodiments include clock signals, timing signals, synchronization signals, local oscillator signals.

Furthermore, the reference signals in exemplary embodiments may be (or may be interpreted as) digital or analog. For example, in some embodiments, some references signals may constitute digital signals, pulses, square waves, and the like. As another example, in some embodiments, some references signals may constitute analog signals, sine signals, cosine signals, and the like. The type (or interpretation of) the references signals depends on factors such as the application, end use, and the like, as persons of ordinary skill in the art understand.

Figure 1:
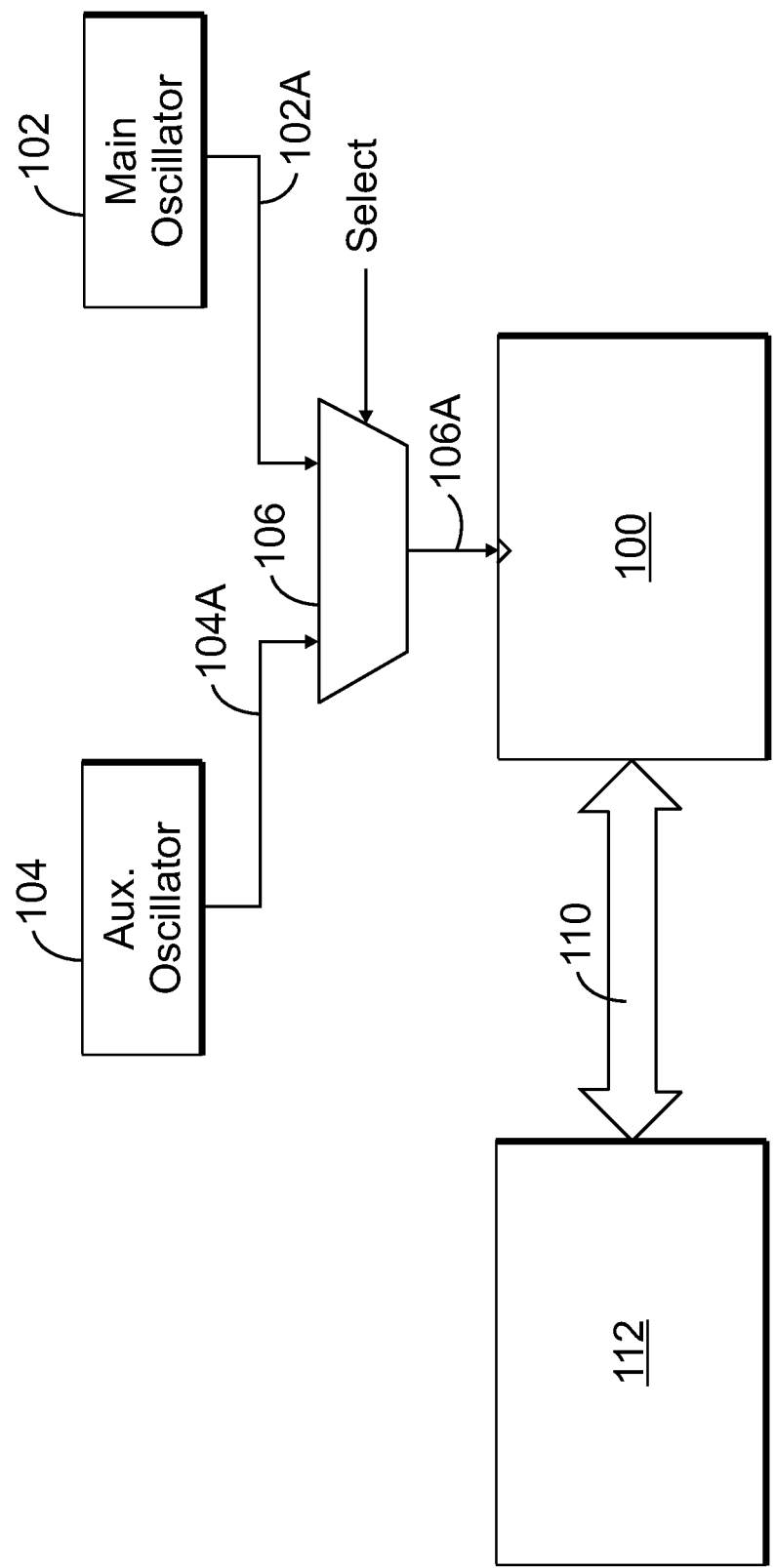
FIG. 1 illustrates a block diagram of circuitry for providing references signals according to an exemplary embodiment.

FIG. 1 illustrates a block diagram of circuitry for providing references signals according to an exemplary embodiment. The embodiment shown in FIG. 1 includes two oscillators (or generally signal generators, in this embodiment and other exemplary embodiments) for generating two references signals, although other numbers and/or types of oscillator may be used.

The circuitry in FIG. 1 includes a circuit or block 100 that uses at least one reference signal 106A, e.g., a clock signal as shown in the exemplary embodiment. In exemplary embodiments, circuit 100 may generally constitute a signal, data, and/or information processing circuit. Circuit 100 may generally include a wide variety of circuitry or blocks of circuitry to process signals, data, or information. Without limitation, examples include analog circuitry (e.g., synthesizers, amplifiers, bias circuits, regulators, oscillators, transmitters, receivers, transceivers, and the like), digital circuitry (communication ports, for example ports conforming to SPI, I²C, 1-Wire®, or other protocols, processors, multiplexers (MUXs), logic gates, registers, flip-flops, digital signal processor (DSP), coders, encoders, and the like), and/or mixed-signal circuitry (analog to digital converters, digital to analog converters, transmitters, receivers, transceivers, etc.).

In exemplary embodiments, circuit 100 may constitute an IC, multi-chip module (MCM), thick-film assembly, thin-film assembly, and the like, as persons of ordinary skill in the art understand.

As described below in detail, reference signal 106A may be selected from reference signals generated by main oscillator 102 and auxiliary oscillator 104. Note that the disclosure uses the labels "main" and "auxiliary" to facilitate presentation of the description, and not necessarily an order of use of the oscillators, preference for the oscillators, their significance, etc. Generally speaking, two or more oscillators may be used to provide two or more reference signals.

Main oscillator 102 and auxiliary oscillator 104 provide references signals 102A and 104A, respectively, to a selection circuit (e.g., a MUX) 106. In response to a select signal, selection circuit 106 provides one of the references signals 102A and 104A, from main oscillator 102 and auxiliary oscillator 104, respectively, to circuit 100 as reference signal 106A.

Selection circuit 106 may be caused to switch between reference signals 102A and 104A one or more times (i.e., provide reference signal 102A at one point in time and provide reference signal 104A at another point in time, or vice-versa. As an example (and as described below in detail), during power up or start up of circuit 100, reference signal 104A may be provided to circuit 100, but during one or more operating modes or functions of circuit 100, reference signal 102A may be provided to circuit 100. As described below in detail, by switching reference signals, one may achieve several advantages. Such advantages include reduced power consumption (of circuit 100 and/or oscillators 102/104), reduced start up time of circuit 100 and/or one of the oscillators, and relatively accurate and/or precise operation of circuit 100 and/or one of the oscillators.

The switching may be made by changing the state of select signal, and may occur in response to any appropriate or desired event or condition in circuit 100 or circuitry external to circuit 100, for example, circuit 112. In some embodiments, the switching of the references signals and/or the provision of reference signals 102A and 104A to selection circuit 106 may be synchronized. In other words, a synchronization circuit or synchronizer, known to persons of ordinary skill in the art, may be used to avoid glitches, jitter, or noise in the phase or frequency of reference signal 106A provided to circuit 100. The synchronizer may synchronize the phase or frequency of reference signal 102A and reference signal 104A. The synchronizer may be included between main oscillator 102 and auxiliary oscillator 104, and selection circuit 106.

In the embodiment shown in FIG. 1, circuit 100 communicates via link 110 (e.g., a bus, communication link, wires, cables, board traces, etc.) with circuit 112. Circuit 112 may, generally speaking, constitute any kind of desired circuit, for example, a source or destination of signals (to and from circuit 100), a controller, a microcontroller unit (MCU), a processor, microprocessor, host processor, and the like.

In exemplary embodiments, circuit 112 may constitute an IC, MCM, thick-film assembly, thin-film assembly, and the like, as persons of ordinary skill in the art understand. In some embodiments, circuit 100 and circuit 112 may reside on the same semiconductor die. In some embodiments, circuit 100 and circuit 112 may reside on different semiconductor die or substrate and in different packages (if the die are packaged). In some embodiments, circuit 100 and circuit 112 may reside on different semiconductor die or substrate but in the same package, e.g., an MCM or flip-chip package (if the die are packaged).

In exemplary embodiments, circuit 112 may communicate to circuit 100 to cause switching of the reference signals, either directly or indirectly. For example, in some embodiments, circuit 112 may indicate through link 110 a request, command, or other indication that it wants to communicate with circuit 100, for example, to obtain information from circuit 100, or to provide information to circuit 100. In response to the indication from circuit 112, circuit 100 may cause a change in the state of the select signal, i.e., switch which of reference signals 102A and 104A is provided to circuit 100 by selection circuit 106.

As another example, in some embodiments, circuit 112 may communicate with selection circuit 106 without going through circuit 100. In this scenario, circuit 112 may control the state of the select signal. In response, selection circuit 106 switches the source of reference signal 106A, i.e., switches from providing reference signal 102A to circuit 100 to providing reference signal 104A, or vice-versa.

As noted, the switching(s) of the reference signals may occur at various times and for a variety of reasons. In exemplary embodiments, one reason may relate to the type of oscillator used (e.g., oscillators 102 and 104), their respective characteristics or specifications, and the type and nature of the respective output signals they provide.

As an example, consider an exemplary embodiment where main oscillator 102 includes a crystal oscillator, and auxiliary oscillator 104 includes an RC (or LC or transconductor-capacitive (Gm-C)) oscillator). As persons of ordinary skill in the art understand, a crystal oscillator provides more accuracy and/or precision, compared to an RC (or LC) oscillator. More specifically, compared to, say, an RC or LC or transconductor-capacitive (Gm-C) oscillator, a crystal oscillator provides a more accurate or precise output (reference) signal, more accurate frequency of oscillation (less deviation from a desired oscillation frequency), less drift (frequency and/or voltage/current) over time, less sensitivity (to temperature, supply variations, etc.). On the other hand, an RC (or LC or transconductor-capacitive (Gm-C)) oscillator may consume less power, may start up or power up more quickly, and/or its output signal (reference signal) may stabilize more quickly.

By using one of the oscillators during one time period and/or operating mode and using another oscillator during another time period and/or operating mode, some performance measures of the circuitry in FIG. 1, including circuit 100, may be improved. In one exemplary embodiment, during one time period, for example, at or after start-up of some of the circuitry in FIG. 1, e.g., circuit 100, main oscillator 102 and auxiliary oscillator 104 may be powered up or switched on or made active. Auxiliary oscillator 102 may start up and becomes stabilized first. Thus, auxiliary oscillator 104 provides reference signal 104A to circuit 100 while main oscillator 102 starts up and its output becomes stabilized.

When the output of main oscillator 102 becomes stabilized, selection circuit 106 may (in response to a signal applied to its select input) to switch the reference signals. In other words, in response to the select signal, selection signal 106 ceases to provide reference signal 104A to circuit 100, and instead provides reference signal 102A, i.e., the reference signal provided by main oscillator 102. Thereafter, circuit 100 may use reference signal 102A to perform desired or specified functionality, e.g., provide status, perform information processing, transmit or receive information, and the like.

At the conclusion of its functions, circuit 100 may enter a sleep period, i.e., some or all of its circuitry and/or functionality be suspended, shut down, powered-down, de-activated, etc. At that point, circuit 100 may not use either reference signal (102A, 104A). Consequently, auxiliary oscillator 104 and main oscillator 102 may be shut down, deactivated, suspended, etc. As a result, power consumption of the overall circuit reduces.

In some embodiments, for example, when circuit 100 is expected to remain in the sleep mode for a relatively short time period, auxiliary oscillator 104 may be left running or operating, rather than shut down or de-activated. In this manner, auxiliary oscillator 104 may provide reference signal 104A to circuit 100 relatively quickly when desired. Such embodiments trade off increased power consumption for response time. By using various combinations of activating and de-activating of main oscillator 102 and auxiliary oscillator 104, a wide variety of situations may be accommodated, as persons of ordinary skill in the art understand.

In some embodiments, a switching of the reference signals may occur when circuit 100 (or other part(s) of the circuitry in FIG. 1) leaves the sleep state, i.e., wakes up, resumes, re-activates, becomes functional, etc. To provide reference signals, main oscillator 102 and auxiliary oscillator 104 are also woken up, resume, re-activate, becomes functional, etc. Because its output signal (reference signal 104A) becomes stable first (relative to reference signal 102A), selection circuit 106 is made to provide reference signal 104A to circuit 100. When main oscillator 102 has finished starting up, reference signal 102A becomes stable, and may be made available to circuit 100. To do so, in response to a signal applied to its select input, selection circuit 106 switches, and provides reference signal 102A as its output 106A to circuit 100.

In some embodiments, main oscillator 102 and/or oscillator 104 may include circuitry that determines the state of the oscillator(s). For example, main oscillator 102 and/or oscillator 104 may include circuitry (not shown explicitly) to determine when the output(s) of the oscillator(s) has become stable according to one or more criteria, and indicate that state via one or more signals (not shown explicitly). Alternatively, in some embodiments, other circuitry (e.g., circuit 100, circuit 112, controller 130 (see FIG. 3 and the description below) may examine (e.g., periodically) the output of main oscillator 102 and/or oscillator 104 to determine when the output(s) has become stable according to one or more criteria.

The stability criteria may include, for example, attaining a desired frequency (or a frequency within a desired band around the desired frequency), attaining a desired output voltage (e.g., when the output voltage ramps up as the oscillator becomes stable), counting a specified or desired number of output signal cycles, etc. Regardless of the particular implementation, such indication(s) of oscillator stability may be used to, at least in part, decide when to switch reference signals (e.g., provide reference signal 102A or reference signal 104A to circuit 100).

The decision may be made in a variety of ways, e.g., by one or more of circuit 100, circuit 112, controller 130 (see FIG. 3 and the description below), etc. More specifically, one or more of circuit 100, circuit 112, controller 130 may make a determination when to switch references signals, and effect the switching of the reference signals by providing an appropriate select signal to selection circuit 106.

As noted above, circuit 100 may be included in an IC or an MCM. In some embodiments, main oscillator 102 and/or auxiliary oscillator 104 may be included or integrated in the IC or MCM. In some embodiments, part of the circuitry of main oscillator 102 and/or auxiliary oscillator 104 may be included or integrated in the IC or MCM. For example, most of the circuitry of main oscillator 102 may be included or integrated in the IC or MCM, but the crystal may reside externally to the IC or MCM. In this manner, a variety of situations, implementations, and end-uses may be accommodated, as persons of ordinary skill in the art understand.

As noted above, in some embodiments, some or all of the circuitry in circuit 100 may be de-activated, suspended, shut down, enter a sleep mode, etc. In some embodiments, the sleep mode may be realized by switching off the supply of power to the desired circuits. In some embodiments, one may route power to such circuits through a controllable switch (e.g., a transistor), and the control the switch so as to switching off power to the circuits.

Figure 2:
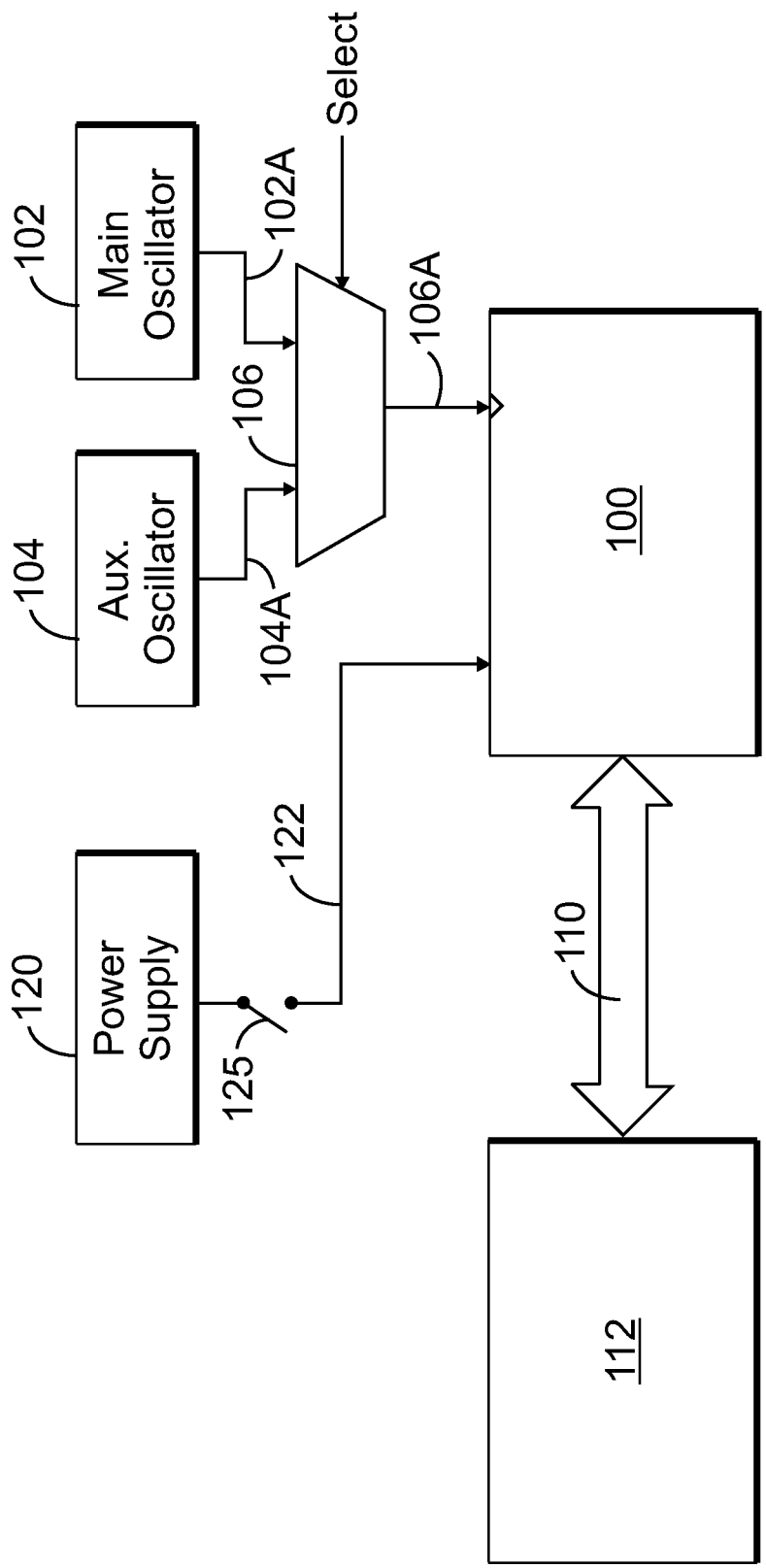
FIG. 2 depicts a block diagram of circuitry for providing references signals according to another exemplary embodiment.

FIG. 2 shows such an embodiment. Some or all of the circuitry in circuit 100 receive power from power supply 120 via switch 125. Switch 125 may be controlled by any desired circuitry, for example, circuit 100, circuit 112, or other circuitry such as controller 130 (as described below in detail with respect to FIG. 3), etc. To activate or power up or start up the desired circuitry in circuit 100, switch 125 may be closed. Conversely, to de-activate or shut down or put into the sleep mode those circuits, switch 125 may be opened.

Note that, alternatively or in addition, in some embodiments power supply 120 may also be de-activated (shut down, put into a sleep mode, suspended, etc.), and re-activated, as desired. By doing so, one may obtain additional power savings at the expense of some responsiveness.

In some embodiments, one may control an on-chip regulator (not shown explicitly), for example, when IC 100 is integrated or is part of an MCM). In such a scenario, one may control the regulator so as to shut down the supply of power to the desired circuits or, conversely, re-activate the circuits by providing power to them. Of course, a variety of other situations may be accommodated in other embodiments, as persons of ordinary skill in the art understand, to provide a flexible scheme for providing power to the desired circuitry.

Figure 3:
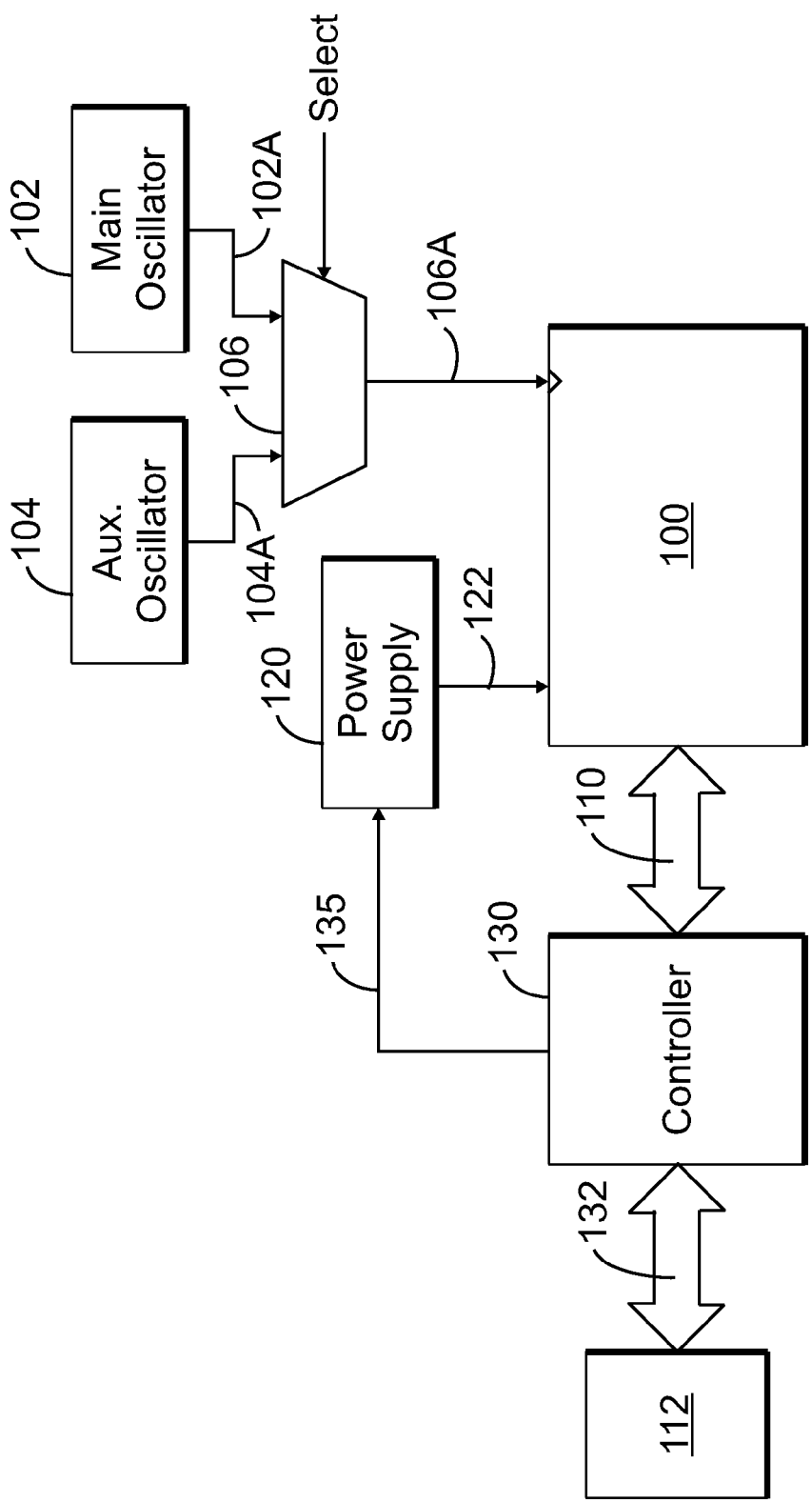
FIG. 3 shows a block diagram of circuitry for providing references signals according to yet another exemplary embodiment.

In some embodiments, a controller may be used to facilitate communication between circuit 100 and other circuitry (e.g., circuit 112), to control some functions of circuit 100, control sleep and active modes of various circuitry (e.g., circuit 100), and/or to switch reference signals. FIG. 3 shows such an embodiment.

Specifically, controller 130 couples to circuit 100 via a link 110. Through link 110, controller 130 and circuit 100 may exchange various signals and information, such as data, general signals, status signals, control signals, configuration signals, etc. Controller 130 may also couple to other circuitry, such as circuit 112, via link 132. Through link 132, controller 130 and other circuitry (e.g., circuit 112, as shown in the exemplary embodiment) may exchange various signals and information, such as data, general signals, status signals, control signals, configuration signals, etc.

By using this configuration, controller 130 and/or other circuitry (e.g., circuit 112) may communicate with, and/or control at least some of the functionality of, various circuitry, such as some or all of circuit 100, main oscillator 102, auxiliary oscillator 104, selection circuit 106 (e.g., to switch reference signals), power supply 120, etc. For example, in some embodiments, by using one or more signals 135, controller 130 may control the functionality of power supply 120, e.g., supply power to some or all of the circuitry in circuit 100, depending on the mode of operation (sleep, active, etc.).

As another example, circuit 112 or other circuitry may provide commands, requests, or control signals to some or all of circuit 100, main oscillator 102, auxiliary oscillator 104, selection circuit 106 (e.g., to switch reference signals), etc. As yet another example, alternatively or in addition to the above scheme, circuit 112 or other circuitry may obtain status signals or information from some or all of circuit 100, main oscillator 102, auxiliary oscillator 104, selection circuit 106

(e.g., to switch reference signals), etc. Examples of such status information include whether one or more of the above circuitry has become stable, progress of a requested function (e.g., for circuit 100 to communicate information to circuit 112), and the like, as persons of ordinary skill in the art understand.

In some embodiments, while circuit 100 is in the sleep mode, controller 130 may detect communication or other activity by circuit 112 (e.g., an MCU) via link 132. In response, controller 130 may initiate a start up or boot sequence. More specifically, controller 130 may cause auxiliary oscillator 104 and main oscillator 102 to start up or power up (for example, in preparation for waking up or starting up circuit 100 or parts of circuit 100 to perform some activity). In one embodiment, controller 130 may cause auxiliary oscillator 104 to start up before main oscillator 102. In this manner, various circuitry, such as some or all of circuit 100, may have available, and use, a reference signal (reference signal 104A, as provided by selection circuit 106) before main oscillator 102 stabilizes. Once main oscillator 102 stabilizes, reference signal 102A may be provided to circuit 100 by selection circuit 106 instead of reference signal 104A.

In some embodiments, controller 130 may serve as a communication controller to facilitate communication between circuit 100 and other circuitry, such as circuit 112. In such situations, link 110 and/or link 132 may constitute or include, at least in part, one or more buses. Controller 130 may control the various functions of the bus, e.g., flow of information, control, and/or status signals, the role of various circuitry (bus master, bus slave), etc.

Figure 4:
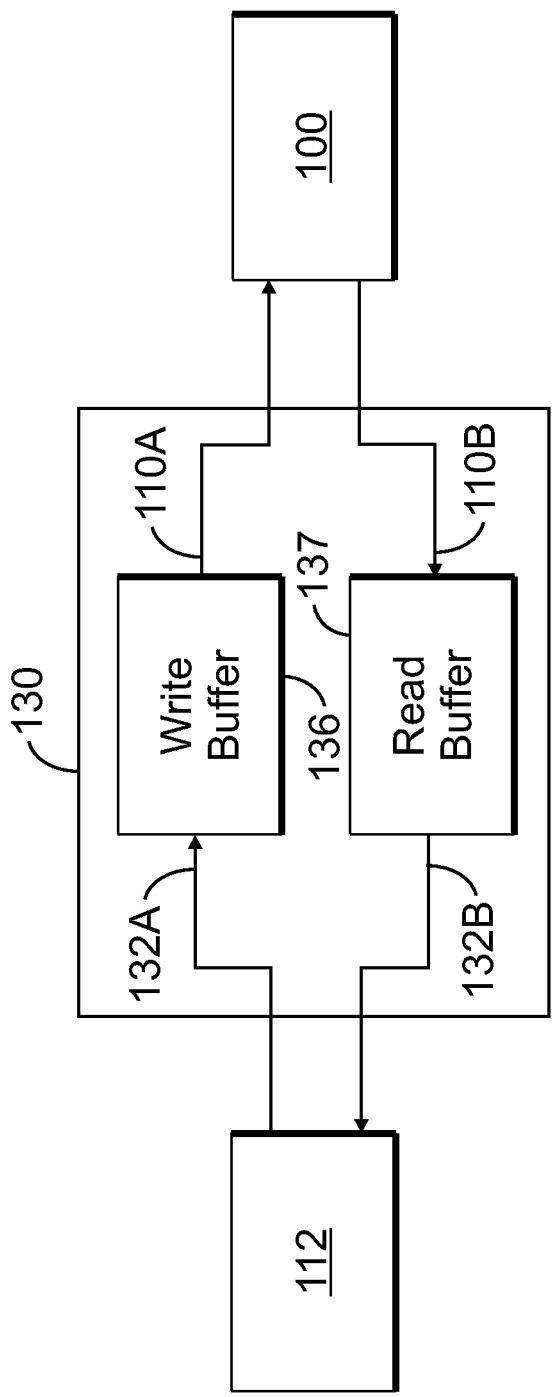
FIG. 4 depicts a block diagram of a controller according to an exemplary embodiment.

To facilitate communication between circuit 100 and other circuitry (e.g., circuit 112), controller 130 may include one or more buffers. FIG. 4 shows a block diagram of controller 130 according to an exemplary embodiment that employs this feature. Specifically, referring to FIG. 4, controller 130 includes write buffer 136 and read buffer 137. Write buffer 136 may receive information from a circuit, such as circuit 112, via link 132A. Via link 110A, write buffer 136 may provide the information to circuit 110. Similarly, read buffer 137 may receive information from circuit 100 via link 110B. Through link 132B, read buffer 137 may provide the information to other circuitry, such as circuit 112.

By using write buffer 136 and/or read buffer 137, controller 130 may allow circuit 100 or other circuitry (e.g., circuit 112) more time during which to respond to a read or write request or command. For example, suppose that circuit 112 wishes to write information to circuit 100, and that circuit 100 is in the sleep mode, busy with other tasks, stabilizing, etc. Controller 130 may issue a signal to circuit 100 to wake up circuit 100, as appropriate. While circuit 100 wakes up, stabilizes, becomes free, etc., controller 130 may receive information from circuit 112, and place the information in write buffer 136. When circuit 100 has woken up, controller 130 may communicate the contents of write buffer 136 to circuit 100.

Conversely, suppose that circuit 100 wishes to communicate information to other circuitry, such as circuit 112. Controller 130 may receive the information from circuit 100 and store the information in read buffer 137. Controller 130 may then communicate the information to the other circuitry, such as circuit 112, in one or more blocks, for example, in a burst mode.

As another example, consider the situation where some circuitry, such as circuit 112, wishes to obtain information from circuit 100, and that circuit 100 is in the sleep mode, busy with other tasks, stabilizing, etc. Controller 130 may issue a signal to circuit 100 to wake up circuit 100, as appropriate. When circuit 100 wakes up, stabilizes, becomes free, etc., controller 130 may obtain the information from circuit 100, and store the information in read buffer 137. Circuit 100 may then enter the sleep mode, return to other tasks, etc. Controller 130 may then communicate the information to the other circuitry, such as circuit 112, in one or more blocks, for example, in a burst mode.

Figure 5:
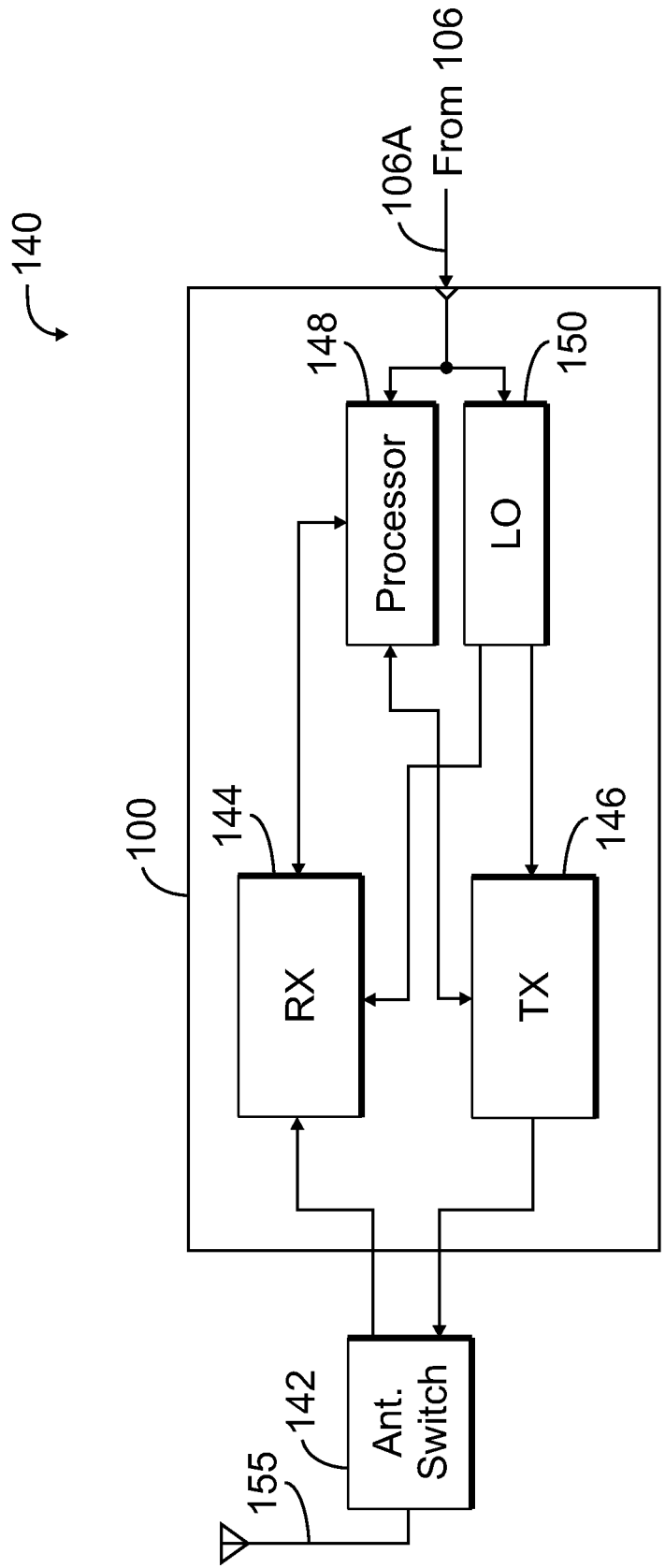
FIG. 5 illustrates a block diagram of a radio-frequency (RF) device for use in exemplary embodiments.

As noted above, circuit 100 may include a variety of types of circuitry, as desired. In some embodiments, circuit 100 may include communication circuitry, such as wired or wireline circuitry (e.g., telephone circuitry, networking circuitry, optical fiber communication circuitry, etc.), wireless circuitry, and the like. FIG. 5 illustrates a block diagram of a wireless device for use in exemplary embodiments.

Specifically, FIG. 5 provides a block diagram of a radio-frequency (RF) device 140 that may wirelessly transmit and receive information. Such a device may be used in a variety of other devices, products, and the like. Examples include mobile communication devices (telephones, personal digital assistants, one-way or two-way radios), telemetry devices, positioning devices (transponders, global position satellite (GPS) devices, etc.

Referring to FIG. 5, wireless device 100 includes circuit 100 (e.g., as described above), antenna 155, and antenna switch 142. Circuit 100 includes receiver 144, transmitter 146, processor 148, and local oscillator (LO) circuit 150. The embodiment shown in FIG. 5 has both receive and transmit capabilities. During the receive mode, antenna switch 142 couples antenna 155 to receiver 144. In other words, antenna switch 142 routes the RF signals to receiver 144.

Receiver 144 may receive RF signals in one or more frequency bands, and may include a variety of types of RF circuitry, such as direct conversation, intermediate-frequency (IF) conversion, etc., as persons of ordinary skill in the art understand. The signals may have a desired encoding or modulation scheme. Receiver 144 may demodulate, decode, and/or decipher the RF signals to provide message signals, such as baseband signals.

Transmitter 146 may transmit message signals, for example, baseband signals. Transmitter 146 may encode and/or modulate the message signal to generate an RF signal suitable for transmission. Transmitter 146 may include a variety of RF circuitry, such as direct-up, etc., as persons of ordinary skill in the art understand. Transmitter 146 provides the RF signal to antenna 155 via antenna switch 142.

In exemplary embodiments, circuit 100 may use one or more LO signals. As persons of ordinary skill in the art understand, LO signals may be used to receive RF signals by receiver 144, and for transmitter 146 to generate and transmit RF signals. In exemplary embodiments, such as low-IF, more than one LO signal may be used, as persons of ordinary skill in the art understand. LO circuit 150 provides the LO signal(s) to receiver 144 and transmitter 146. To generate the LO signal(s), LO circuit 150 may use one or more reference signals, such as reference signal 106A provided by selection circuit 106 (not shown).

Processor 148 may provide signal processing, control, and/or supervisory functions. For example, processor 148 may provide encoding, modulation, and decoding functions. Processor 148 may also provide mechanisms for communicating with, responding to, and/or controlling other circuitry, such as circuit 112, controller 130, main oscillator 102, auxiliary oscillator 104, and/or selection circuit 106, etc. To perform its functions, processor 148 in exemplary embodiments uses one or more reference signals, such as reference signal 106A provided by selection circuit 106 (not shown).

As persons of ordinary skill in the art understand, one may apply the disclosed concepts effectively to various types of RF device. The example shown in FIG. 5 constitutes merely an illustrative application. One may use a variety of other RF devices, as desired. Without limitation, examples include RF devices that include receive capability but lack transmit capability, RF devices that include transmit capability but not receive capability, etc. In such instances, more than one antenna may be used, the antenna switch omitted (e.g., when one but not both receive and transmit capabilities exist), etc. Such modifications fall within the level of skill of persons of ordinary skill in the art.

Figure 6:
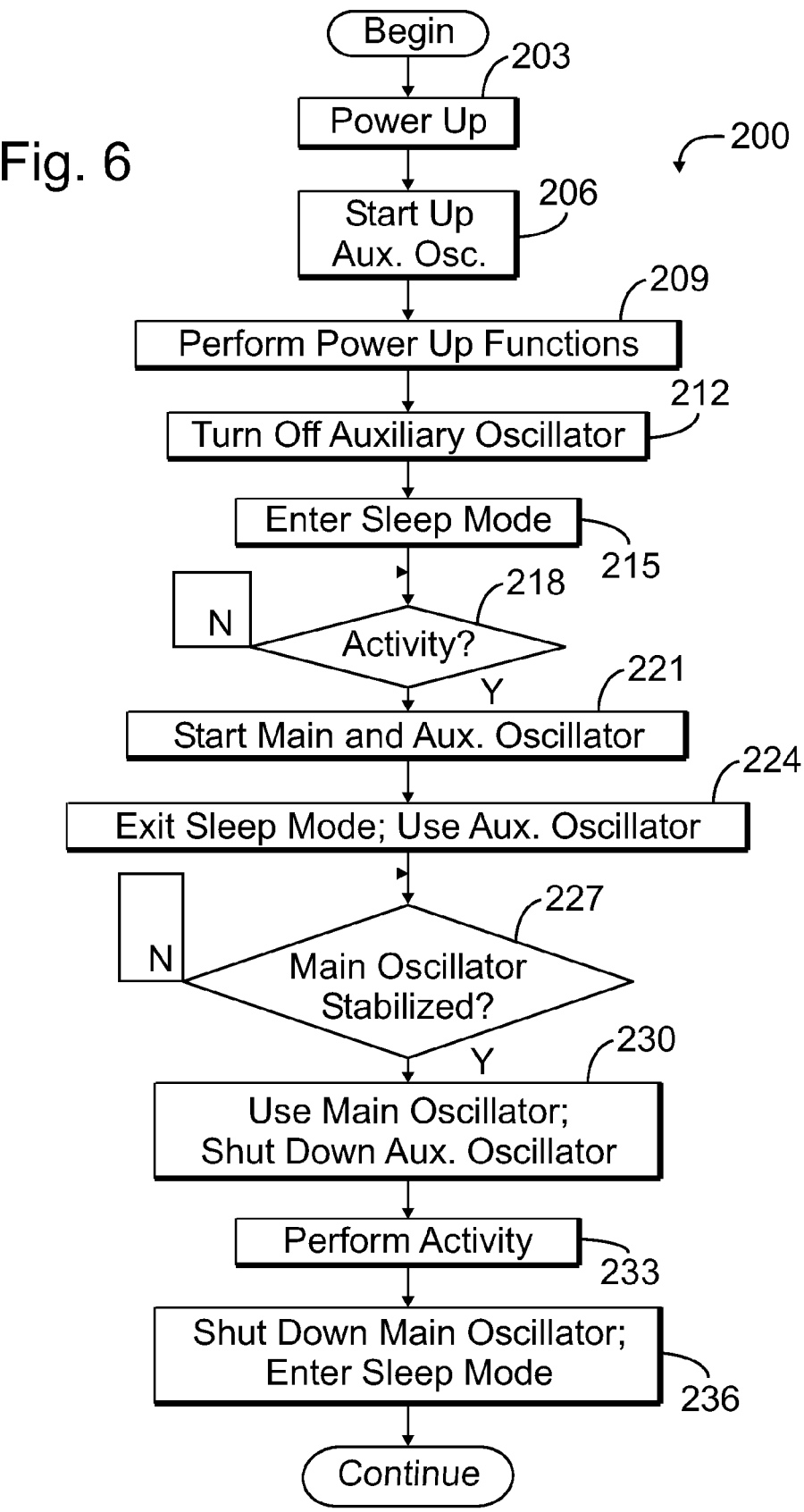
FIG. 6 depicts a flow diagram of a method for providing reference signals according to an exemplary embodiment.

FIG. 6 depicts a flow diagram of a method for providing reference signals according to an exemplary embodiment. At 203, a circuit or device, such as circuit 100, powers up. At 206, auxiliary oscillator 104 starts up or powers up. If the use of the output of main oscillator 104 is contemplated or desired, main oscillator 104 may be powered up, as well. At 209, circuit 100 may use the output of auxiliary oscillator 104 to perform power up functions. If main oscillator 102 was started up, at some point later, the output of oscillator 102 stabilizes, and circuit 100 may use that output to perform additional functions, as desired.

At 212, any desired functions have been performed by circuit 100, so auxiliary oscillator 104 is turned off, shut down, de-activated, powered down, etc. If it has been started up, main oscillator 102 may also be turned off, shut down, de-activated, powered down, etc. At 215, circuit 100 (or at least part of circuit 100) enters the sleep mode.

At 218, a check is made to determine whether any activity is desired, detected (e.g., on a bus, by controller 130, etc.), or pending. If not, the check is repeated, while circuit 100 (or at least part of circuit 100) remains in the sleep mode. If activity is detected, or pending, at 221 main oscillator 102 and auxiliary oscillator 104 start up or power up.

At 224, circuit 100 (or at least part of circuit 100) exits the sleep mode, and uses the output of auxiliary oscillator 104 to perform desired functions. At 227 (which may occur concurrently with 224), a check is made to determine whether main oscillator 102 has stabilized. If not, the check is repeated. If, however, main oscillator 102 has stabilized, at 230 the output of main oscillator 102 is used as a reference signal, and auxiliary oscillator 104 is turned off, shut down, de-activated, powered down, etc.

At 233, circuit 100 performs the desired activity. Circuit 100 may use the output of main oscillator 102 as a reference signal to perform the activity. Optionally, once the activity has concluded, at 236 main oscillator 102 is turned off, shut down, de-activated, powered down, etc. Also, circuit 100 (or at least parts of circuit 100) may enter the sleep mode.

In exemplary embodiments, the functionality of various blocks may be implemented using hardware, software, firmware, etc. The choice of implementation depends on a variety of factors, such as the cost and performance specifications for a given implementation or end-use. Regardless of the particular implementation in a given situation, the techniques described above may be used by making appropriate modifications.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art who have the benefit of this disclosure may use certain features of the disclosed concepts independently of the use of other features, without departing from the scope of the disclosed concepts.

The invention claimed is:

1. An apparatus comprising:
    a signal processing circuit to process signals using a reference signal;
    a first oscillator to provide a first reference signal;
    a second oscillator to provide a second reference signal; and
    a selection circuit to selectively provide to the signal processing circuit one of the first and second reference signals depending on a mode of operation of the signal processing circuit,
    wherein the first reference signal is provided to the signal processing circuit during power up or sleep modes of the signal processing circuit.

2. The apparatus according to claim 1, wherein the first reference signal is more accurate than the second reference signal.

3. The apparatus according to claim 2, wherein the second reference signal stabilizes more quickly than the first reference signal after the first and second oscillators start up.

4. The apparatus according to claim 1, wherein the first oscillator comprises a crystal oscillator.

5. The apparatus according to claim 4, wherein the second oscillator comprises a resistive-capacitive (RC), transconductor-capacitive (Gm-C), or capacitive-inductive (LC) oscillator.

6. The apparatus according to claim 1, wherein the selection circuit comprises a multiplexer (MUX).

7. The apparatus according to claim 6, further comprising a synchronizer coupled to the selection circuit to synchronize the first and second reference signals.

8. The apparatus according to claim 1, further comprising a controller coupled to the signal processing circuit, the controller to provide a select signal to the selection circuit to selectively provide to the signal processing circuit one of the first and second reference signals.

9. The apparatus according to claim 1, wherein the second reference signal is provided to the signal processing circuit during an active mode of the signal processing circuit.

10. A communication apparatus comprising:
    a radio-frequency (RF) device, to operate using a reference signal, to process RF signals;
    a first oscillator to provide a first reference signal to be used as the reference signal during a first mode of operation of the RF device;
    a second oscillator to provide a second reference signal to be used as the reference signal during a second mode of operation of the RF device; and
    a selection circuit to selectively provide as the reference signal one of the first and second reference signals, wherein the first oscillator is used during an active mode of the RF device, and the second oscillator is used during start up or sleep modes of the RF device.

11. The communication apparatus according to claim 10, wherein the first reference signal has a more accurate frequency with respect to a desired frequency than does the second reference signal, and wherein the second oscillator stabilizes more quickly after powering up than does the first oscillator.

12. The communication apparatus according to claim 10, wherein the RF device comprises a receiver that uses the reference signal.

13. The communication apparatus according to claim 10, wherein the RF device comprises a transmitter that uses the reference signal.

14. The communication apparatus according to claim 10, wherein the RF device comprises a transceiver that uses the reference signal.

15. A method of operating a signal processing circuit that uses a reference signal to process signals, the method comprising:

providing to the signal processing circuit as the reference signal a first reference signal from a first oscillator during a first mode of operation of the signal processing circuit; and providing to the signal processing circuit as the reference signal a second reference signal from a second oscillator during a second mode of operation of the signal processing circuit, wherein the second mode of operation of the signal processing circuit comprises start up mode or sleep mode, and wherein the first mode of operation of the signal processing circuit comprises an active mode.

16. The method according to claim 15, further comprising powering down at least a portion of the circuitry in the signal processing circuit during the sleep mode.

17. The method according to claim 15, wherein the first oscillator is more precise than the second oscillator, and wherein, after the first and second oscillators have started up, the second reference signal stabilizes before the first reference signal stabilizes.

* * * * *